(12) United States Patent
Hokkirigawa et al.

(10) Patent No.: US 7,306,374 B2
(45) Date of Patent: Dec. 11, 2007

(54) SPECIAL TYPE BEARING DEVICE

(75) Inventors: Kazuo Hokkirigawa, Yonezawa (JP); Rikuro Obara, Nagano-ken (JP)

(73) Assignee: Minebea Co., Ltd., Nagano-ken (JP)

( * ) Notice: Subject to any disclaimer, the term of this patent is extended or adjusted under 35 U.S.C. 154(b) by 0 days.

(21) Appl. No.: 11/639,107

(22) Filed: Dec. 14, 2006

(65) Prior Publication Data

US 2007/0116390 A1    May 24, 2007

Related U.S. Application Data

(62) Division of application No. 10/927,343, filed on Aug. 26, 2004, now Pat. No. 7,168,857, which is a division of application No. 10/078,682, filed on Feb. 19, 2002, now Pat. No. 6,799,893.

(30) Foreign Application Priority Data

Feb. 21, 2001   (JP)  ............... 2001-045835

(51) Int. Cl.
*F16C 17/10*   (2006.01)
*F16C 33/20*   (2006.01)

(52) U.S. Cl. ............... 384/297; 384/192; 384/902; 384/907.1

(58) Field of Classification Search ............. 384/907.1, 384/902, 909, 276, 297, 192, 206
See application file for complete search history.

(56) References Cited

U.S. PATENT DOCUMENTS

2002/0114548 A1*   8/2002   Hokkirigawa et al. ...... 384/297

\* cited by examiner

*Primary Examiner*—Thomas R. Hannon
(74) *Attorney, Agent, or Firm*—Flynn, Thiel, Boutell & Tanis, P.C.

(57) ABSTRACT

The invention provides a special type bearing device that is insusceptible to damage, is light in weight, has a long service life and excellent wear resistance, is insusceptible to the effect of change in temperature, is easy to fabricate, and has little offensiveness towards mating members. Further, the same is capable of sufficiently retaining a lubricant such as oil and grease, and retaining the lubricant for a long period of time without the need of supplying oil during operation, thereby rendering it maintenance-free. That is, the special type bearing device as described above has an axial shaft, a pair of rotating bodies fixedly attached to the shaft, and a supporting body with which the rotating bodies are in contact, wherein any one of the shift, the rotating bodies, and the supporting body is made of RB ceramic or CRB ceramic.

2 Claims, 5 Drawing Sheets

SPECIAL TYPE BEARING DEVICE

This is a division of U.S. Ser. No. 10/927 343, filed Aug. 26, 2004 now U.S. Pat. No. 7,168,857, which is a division of U.S. Ser. No. 10/078 682, filed Feb. 19, 2002 now U.S. Pat. No. 6,799,893.

BACKGROUND OF THE INVENTION

1. Field of the Invention

The present invention relates to a special type bearing device making use of a new type of high-tech eco-material (state-of-the-art material having excellent ecological adaptability) which is different from conventional industrial material in that biomass resources are utilized.

2. Description of the Related Art

For conventional special type bearing devices, copper-based or iron-based sintered alloys, polymer resin materials (nylon, Teflon, other synthetic resin, and so forth), and non-ferrous materials, such as phosphor bronze, brass and so forth, have been in widespread use, however, each of these materials have its own problem.

Conditions required of special type bearing devices include a small friction coefficient, low susceptibility to the effect of temperature, ease in fabrication, low cost, and slight offensiveness towards mating members.

None of the various conventional materials described above can satisfy all these conditions as required.

For example, the copper-based sintered alloy is soft and has a large friction coefficient, so that it is susceptible to the effect of change in temperature while its wear resistance is less than satisfactory depending on its application.

The iron-based sintered alloy has problems in that it is inferior in affinity and conformability with mating members, incapable of raising its oil retention ratio to a sufficiently high level, has a high expansion coefficient and so forth.

As for the polymer resin material, it is in principle intended for use in the case of dry friction where no lubricating oil is used, and its application is limited to the cases of use under a light load, use in a dry condition, and so forth. Further, it has problems such as limitations to enhancement of friction coefficient as well as wear resistance besides a problem of thermal expansion.

Meanwhile, the non-ferrous material described above can exhibit a function of satisfactory lubrication in its application under a high load, at low revolutions and so forth, however, it is not necessarily satisfactory in respect of friction coefficient, and wear resistance.

Now, an attempt to obtain a porous carbonaceous material by utilizing rice bran, produced in quantity of 900,000 tons a year in Japan and in as much as 33 million tons a year throughout the world, has been well known by researches carried out by Mr. Kazuo HOKKIRIGAWA, the first inventor of the present invention (refer to "Functional Material", May issue, 1997, Vol. 17, No. 5, pp. 24~28).

Herein are disclosed a carbonaceous material (referred to hereinafter as RB ceramic) obtained by mixing degreased bran derived from rice bran with a thermosetting resin, kneading, drying a formed kneaded mixture obtained by pressure-forming a kneaded mixture, and subsequently, firing the formed kneaded mixture as dried in an inert gas, and a method of producing the carbonaceous material.

With such a method as described above, however, it has been practically difficult to form the formed kneaded mixture with high precision because there occurs discrepancy in dimensions by as much as 25% in terms of a contraction ratio of the dimensions of a finished formed product obtained after firing in the inert gas to those of the formed kneaded mixture prepared by pressure-forming.

It is therefore an object of the invention to solve drawbacks of the conventional special type bearing units described above, and to provide a special type bearing device capable of satisfying all the requirements as described, that is, a special type bearing device that is insusceptible to damage, is light in weight, has a long service life and excellent wear resistance, is insusceptible to the effect of variation in temperature, is easy to fabricate, and has little offensiveness towards mating members, the special type bearing device further being capable of sufficiently retaining a lubricant such as oil and grease, and retaining the lubricant for a long period of time without the need of supplying oil during operation, thereby being rendered maintenance-free.

SUMMARY OF THE INVENTION

A new class of ceramic (CRB ceramic) as described later, representing further improvement on RB ceramic, is a ceramic material friendly to nature, obtained by using rice bran as a raw material, and by mixing degreased bran derived from the rice bran with a thermosetting resin before firing. CRB ceramic has the following excellent features:
- very high hardness
- very small expansion coefficient
- porous organization structure
- good electrical conductivity
- small specific gravity and light weight
- very small friction coefficient
- excellent wear resistance
- easy to mold or to form in a die
- a small contraction ratio of the dimensions of a finished product to those of a formed workpiece
- ceramic material having varying features can be produced by mixing with a variety of resins
- the raw material being rice bran, there is little adverse effect on global environment, leading to conservation of natural resources.

Accordingly, it can be said that this ceramic material has conditions suitable for application to a special type bearing device, such as insusceptibility to damage, light weight, a long service life, capability of retaining oil and grease for a long period of time, and so forth.

The ceramic (CRB ceramic) described above is an improved material of RB ceramic, that is, a black resin or porous ceramic, obtained by mixing degreased bran derived from rice bran with a thermosetting resin before kneading, subjecting a kneaded mixture thus obtained to a primary firing in an inert gas at a temperature in a range of 700 to 1000° C., pulverizing the kneaded mixture after the primary firing into carbonized powders passing through a 100-mesh sieve, mixing the carbonized powders with a thermosetting resin before kneading, pressure-forming a kneaded mixture at pressure in a range of 20 to 30 MPa, and subjecting a formed workpiece thus obtained again to a heat treatment in an inert gas atmosphere at a temperature in a range of 100 to 1100° C. CRB ceramic differs largely from RB ceramic in that in contrast with RB ceramic having a contraction ratio of the dimensions of a finished product thereof to those of a formed workpiece at as high as 25%, CRB ceramic has a very small contraction ratio at not more than 3%, rendering it superior to RB ceramic.

The inventor has discovered that special type bearing devices having a variety of features can be fabricated with ease by applying CRB ceramic as material for at least a part of the respective special type bearing devices.

In another aspect of the present invention, the dimensions of a workpiece already formed of RB ceramic can be properly adjusted by shaving the same although the conventional RB ceramic has a contraction ratio of the dimensions of a finished product thereof to those of the workpiece already formed at as high as 25%, and therefore, the invention does not exclude embodiments thereof, using RB ceramic. Because RB ceramic has substantially the same property as that of CRB ceramic except in respect of the dimensions of the finished product thereof, the invention does not exclude embodiments thereof, using RB ceramic, in this regard either.

In carrying out the invention, however, it is preferable to use mainly CRB ceramic because a product of high-precision dimensions can be obtained through one forming process in this case.

Further, it has been discovered that special type bearing devices having a variety of features can be fabricated by introducing novel configurations to contact parts of the system as well as by suitable combination of material used for a conventional special type bearing device made of synthetic resin with material used for a conventional special type bearing device made of steel based metal.

More specifically, the invention provides a special type bearing device comprising an axis, a rotating body or rotating bodies, fixedly attached to the axis or formed integrally therewith, and a supporting body with which the rotating body or the rotating bodies are in contact, wherein at least a part of the axis, the rotating body or the rotating bodies, and the supporting body is made of RB ceramic or CRB ceramic.

DESCRIPTION OF THE PREFERRED EMBODIMENTS

Figure 1:
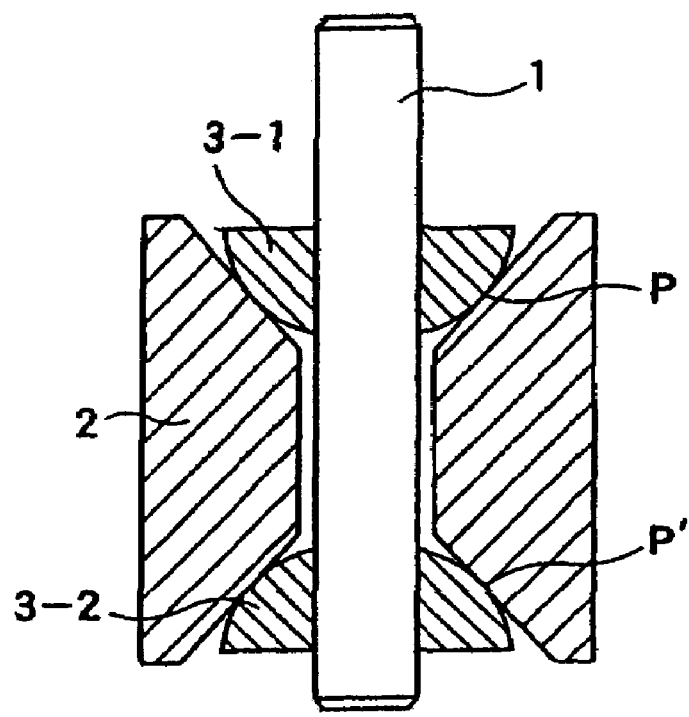
FIG. 1 is a sectional view of an example of a special type bearing device according to the invention.

RB ceramic or CRB ceramic material for use in a special type bearing device according to the invention is made of degreased bran derived from rice bran for use as a main raw material, and a thermosetting resin.

The degreased bran may be of either a local origin or a foreign origin regardless of the kind of rice.

Further, any thermosetting resin may be used as long as it has a thermosetting property, and typical examples thereof include a phenol resin, diaryl phthalate resin, unsaturated polyester resin, epoxy resin, polyimide resin, and triazine resin. In particular, a phenol resin is preferably used.

Furthermore, a thermoplastic resin, such as a polyamide and so forth, can be used in combination with a thermosetting resin provided that it is used without departing from the spirit and scope of the invention.

A mixing ratio of the degreased bran to a thermosetting resin is 50 to 90:50 to 10 by weight, however, the mixing ratio of 70 to 80:30 to 20 is preferably adopted.

A method of producing the RB ceramic material has been well known by researches carried out by Mr. Kazuo Horikirikawa, the first inventor of the present invention (reference: "Functional Material", May issue, 1997, Vol. 17, No. 5, pp. 24~28).

That is, described therein are a carbonaceous material obtained by mixing degreased bran derived from rice bran with a thermosetting resin before kneading, drying a formed kneaded mixture obtained by pressure-forming a kneaded mixture, and subsequently, firing the formed kneaded mixture as dried in an inert gas atmosphere, and a method of producing the same.

Now, a method of producing the CRB ceramic material is briefly described hereinafter. The method comprises the steps of mixing degreased bran derived from rice bran with a thermosetting resin before kneading, subjecting a kneaded mixture thus obtained to a primary firing in an inert gas at a temperature in a range of 700 to 1000° C., pulverizing the kneaded mixture after the primary firing into carbonized powders, mixing the carbonized powders with a thermosetting resin before kneading, pressure-forming a kneaded mixture thus obtained at a pressure in a range of 20 to 30 MPa, and subjecting a formed workpiece thus obtained again to a heat treatment at a temperature in a range of 100 to 1100° C. in an inert gas atmosphere.

A thermosetting resin in a liquid state, having a relatively small molecular weight, is desirable as the thermosetting resin for use in the primary firing.

A rotary kiln is normally used in carrying out the primary firing, and a firing time is for a duration in a range of 40 to 120 min. A mixing ratio of the carbonized powders obtained by the primary firing to the thermosetting resin is 50 to 90:50 to 10 by weight, however, the mixing ratio of 70 to 80:30 to 20 is preferably adopted.

The kneaded mixture of the carbonized powders and the thermosetting resin is pressure-formed at a pressure in a range of 20 to 30 MPa, preferably, in a range of 21 to 25 MPa. A die used is preferably at a temperature of about 150° C.

For the heat treatment, a well controlled electric furnace is employed, and heat treatment time is in a range of about 60 to 360 min.

A heat treatment temperature is preferably in a range of 600 to 1100° C., and a warming rate up to the heat treatment temperature is required to be relatively moderate up to 500°

C. In terms of more specific values, the warming rate is in a range of 0.5 to 2° C./min, and is preferably 1° C./min.

Further, in lowering the temperature of the formed workpiece after baking by the heat treatment, a relatively moderate cooling rate is required until reaching 500° C. Upon the temperature dropping below 500° C., the formed workpiece is left to cool by itself. In terms of more specific values, the cooling rate is in a range of 0.5 to 4° C./min, and is preferably 1° C./min.

Further, the inert gas for use at the time of the primary firing and the heat treatment may be any gas selected from the group consisting of helium, argon, neon, and nitrogen gas, however, nitrogen gas is preferably used.

Further, the RB ceramic or CRB ceramic used in carrying out the invention is preferably dehydrated at a temperature not lower than 100° C. after being formed.

With the special type bearing device according to the invention, the RB ceramic or the CRB ceramic is used for a part or the whole of a rotating body or rotating bodies, a supporting body, and an axis.

The RB ceramic or the CRB ceramic can be used in, for example, a part or the whole of the axis, the rotating body or bodies, and the supporting body. The RB ceramic or the CRB ceramic, impregnated with a lubricating oil, is preferably used.

Synthetic resin and steel based metal, in common use as material for conventional special type bearing units, can be combined with the RB ceramic or the CRB ceramic as appropriate.

For the synthetic resin, any synthetic resin selected from the group consisting of a polyolefin, such as hard polyethylene, and polypropylene, polyamide, such as nylon-66, polycarbonate, and so forth may be used provided that it is hard to a degree and strong.

For the steel based metal, any metal such as an alloy of steel combined with nickel, chromium, molybdenum, etc. may be used provided that it is hard and insusceptible to rust. A stainless steel is a type of material which is preferably used.

Further, a steel with its surface plated such as chromium plated steel may be used.

With the special type bearing device according to the invention, the rotating body and the supporting body can be configured into a variety of shapes.

The shape of the rotating body is preferably a hemisphere, a cone, a sphere, a ring or a disc, and so forth.

Examples of the sphere include a proper sphere and an oval.

With the special type bearing device according to the invention, a contact condition between the rotating body and the supporting body will be surface contact or line contact.

Examples of line contact include a case where the rotating body is a hemisphere, and the supporting body has a tapered face. Cited as such a case is one where, for example, a pair of hemispheres whose spherical surfaces are opposed to each other are provided integrally with an axis, or fixedly attached to the axis by adhesion, bonding, or so forth so as to be in contact with a tapered sleeve having a conical surface expanding inward on both sides thereof as seen in section between the hemispheres (refer to FIGS. 1, 4, and 5).

Another example of line contact is a case where the rotating body is a sphere, and the supporting body has a conical surface. For example, a sphere is provided integrally with an axis, or fixedly attached to the axis by adhesion, bonding, or so forth so as to be in contact with a tapered sleeve having a conical surface caving in on both the inner sides thereof as seen in section in such a way as to surround the sphere. In this case, oscillation of the axis while in rotation is enabled (refer to FIG. 7).

Examples of surface contact include a case where the rotating body is a cone and a supporting body is a cone having a conical surface expanding inward on both sides thereof as seen in section. Cited as such a case is one where, for example, a pair of rotating bodies whose conical surfaces are opposed to each other are provided integrally with an axis, or fixedly attached to the axis by adhesion, bonding, or so forth so as to be in contact with a tapered sleeve having a conical surface expanding inward on both sides thereof as seen in section (refer to FIG. 3).

Figure 6:
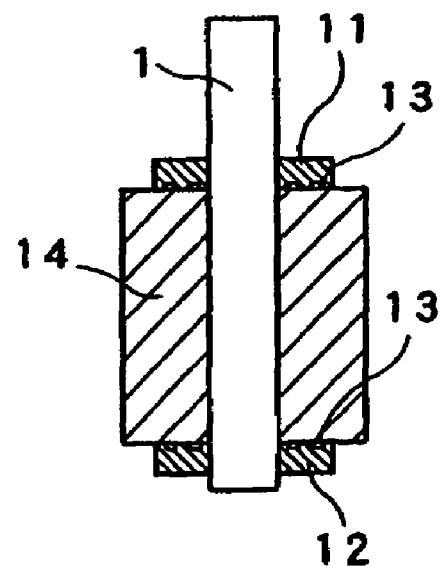
FIG. 6 is a sectional view of a still further example of a special type bearing device according to the invention.

Another example of surface contact is a case where each of a pair of rotating bodies is a side ring, and a supporting body is a sleeve (refer to FIG. 6).

Still another example of surface contact is a case where a rotating body is a sphere having a convex surface, and is in contact with a supporting body having a concave spherical surface so as to be partially surrounded by the latter. In this case, oscillation of the axis while in rotation is enabled (refer to FIG. 10).

Further, in the case of surface contact, one or more than one grooves are preferably provided on a fitting face of the supporting body or a contact face of the side ring. With such a construction as described, friction trouble can be avoided by allowing wear powder or other foreign matters such as dust to be removed from friction faces. The grooves are preferably configured into an annular shape, spiral shape, or radial shape.

With the special type bearing device according to the invention, the rotating body or the supporting body may be preloaded or energized. In this way, preload is constantly applied to contact parts of these bodies, so that new contact parts are automatically formed to cope with elements such as wear, occurring to friction parts of both the bodies, in contact with each other.

Such preload or energization may be applied from one direction, or from two directions opposite to each other. For example, the preload or energization may be applied from one side in the direction parallel to the axial direction, or from both sides in the direction parallel to the axial direction.

Further, the supporting body may be divided into parts, and the preload or energization may be applied in a gap therebetween. In the case of the rotating body being a sphere, the supporting body can be pressurized or energized by the agency of spacers.

The preload or energization may normally be applied by use of a spring, such as a metal spring, rubber spring, and so forth, in such a way as to cause the rotating body or the supporting body to be pushed out or to undergo contraction.

The special type bearing device according to the invention is applicable to driving equipment in general, such as a miniature motor and so forth, as a bearing with improved performance in various respects in place of a conventional sleeve bearing made of sintered material, and a conventional bearing made of polymer resin. Examples of such a product to which the special type bearing device is applied include the following:

1. spindle motor for a hard disc drive
2. spindle motor for a floppy disc drive
3. polygon mirror
4. miniature motor for the automobile
5. miniature motor for office automation equipment including, for example, a copying machine, printer, facsimile machine, and so forth 6. hard disc drive swing arm applied to a pivot bearing
7. miniature stepping motor
8. fan motor for use in a blower, and so forth
9. motor for a sawing machine In particular, the special type bearing device according to the invention is preferably assembled into a miniature motor, for example, a spindle motor, a pivot ass'y. bearing for an HDD, and so forth.

Embodiments of the invention are summed up as follows:

(1) a special type bearing device comprising an axis, a pair of rotating bodies fixedly attached to the axis, and a supporting body with which the rotating bodies are in contact, wherein any one of the axis, the rotating bodies, and the supporting body is made of RB ceramic or CRB ceramic.

(2) a special type bearing device as set forth under item (1) above, wherein the rotating bodies, and the whole or only contact parts of the supporting body are made of RB ceramic or CRB ceramic.

(3) a special type bearing device as set forth under item (1) or (2) above, wherein each of the rotating bodies is in the shape of a hemisphere or a cone, and the supporting body has a conical surface suitable for accommodating the rotating bodies.

(4) a special type bearing device as set forth under item (3) above, wherein one or more than one groove are provided on contact faces of the supporting body, in contact with each of the rotating bodies.

(5) a special type bearing device as set forth under item (4) above, wherein the groove or grooves are configured into an annular shape, spiral shape, or radial shape.

(6) a special type bearing device as set forth under any one of items (1) to (5) above, wherein any one of the pair of the rotating bodies is kept out of contact with the axis, and is preloaded in the direction towards the other of the rotating bodies.

(7) a special type bearing device as set forth under any one of items (1) to (5) above, wherein both of the pair of the rotating bodies are kept out of contact with the axis, and are preloaded from two directions opposite to each other, respectively.

(8) a special type bearing device as set forth under any one of items (1) to (7) above, wherein the supporting body is divided into two parts so as to be preloaded.

(9) a sleeve bearing device comprising an axis, a pair of side rings fixedly attached to the axis, and a sleeve, wherein any one of the axis, the side rings, and the sleeve is made of RB ceramic or CRB ceramic.

(10) a sleeve bearing device as set forth under item (9) above, wherein one or more than one groove, configured into an annular shape, spiral shape, or radial shape, are provided on a contact face of each of the side rings.

(11) a spherical special type bearing comprising an axis, a rotating body fixedly attached to the axis, and a supporting body, the rotating body being a spherical body while the supporting body supporting the spherical body in such a way as to surround the latter at four points, wherein any one of the axis, the rotating body, and the supporting body is made of RB ceramic or CRB ceramic.

(12) a spherical special type bearing as set forth under item (11) above, wherein the spherical body is either a proper sphere or an oval.

(13) a spherical special type bearing as set forth under item (11) or (12) above, wherein the quartered parts of the supporting body are integrally joined together with spacers and are kept energized.

(14) a spherical special type bearing comprising an axis, a rotating body in the shape of a sphere having a convex surface, fixedly attached to the axis, and a supporting body having a concave spherical surface, the sphere having the convex surface in surface contact with the supporting body having the concave spherical surface across the entire surface thereof, wherein any one of the axis, the rotating body, and the supporting body is made of RB ceramic or CRB ceramic.

(15) a special type bearing device as set forth under any one of items (1) to (14) above, wherein any one of the axis, the rotating body, and the supporting body is made of RB ceramic or CRB ceramic, and the RB ceramic or the CRB ceramic is impregnated with a lubricating oil.

(16) a miniature motor incorporating the special type bearing device as set forth under any one of items (1) to (15) above.

(17) a spindle motor incorporating the special type bearing device as set forth under any one of items (1) to (15) above.

(18) a pivot ass'y for an HDD, incorporating the special type bearing device as set forth under any one of items (1) to (15) above.

Now, various examples of the special type bearing device according to the invention are described hereinafter with reference to the accompanying drawings.

FIG. 1 shows an example of a special type bearing device according to the invention as (R-A).

The special type bearing device (R-A) is fabricated as follows.

More specifically, a hemisphere 3-1, made of RB ceramic or CRB ceramic, is fixedly attached to a shaft (an axis) 1 by bonding in a press fit or by other means such as a mechanical method, and is inserted into the bore of a tapered sleeve 2 as far as the hemisphere 3-1 comes into contact with a tapered part of the tapered sleeve 2, on the side of one end thereof (up to contact points P as seen in section). Subsequently, a hemisphere 3-2 is fitted into the bore of the tapered sleeve 2 from the side of the other end of the shaft 1 as far as the hemisphere 3-2 comes into contact with a tapered part of the tapered sleeve 2, on the other side thereof (up to contact points P' as seen in section) while applying a preload thereto, thereby fixedly attaching the hemisphere 3-2 to the shaft 1 by bonding in a press fit or by other means such as a mechanical method.

Figure 2:
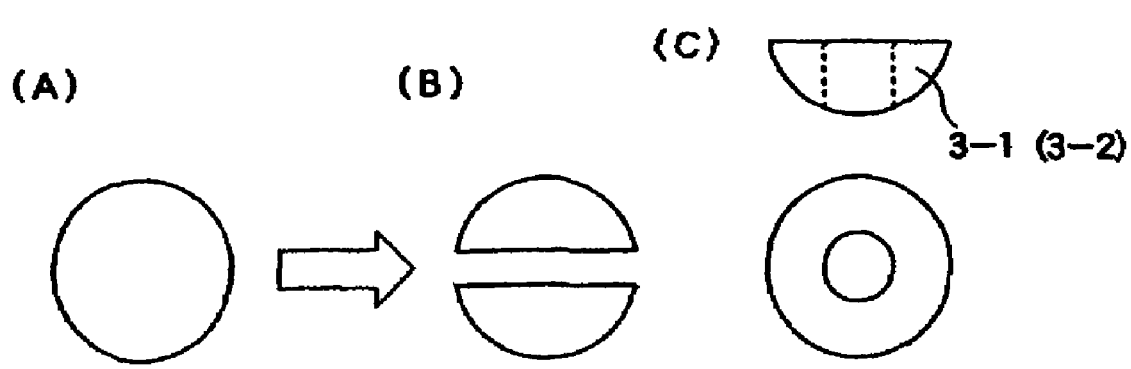
FIG. 2 is a schematic illustration of a hemisphere of the special type bearing device shown in FIG. 1.

As shown in FIG. 2, the hemispheres 3-1, 3-2 are fabricated by processing a sphere A prepared by firing CRB ceramic in a die to a high degree of sphericity, slicing the sphere A crosswise into equal parts, that is, hemispheres B, B and subsequently, boring a hole in the respective hemispheres B, B for fitting the same onto the shaft 1.

Alternatively, a hole may be bored in the sphere A as it is before slicing the same crosswise, and the hemispheres may be impregnated with oil for lubrication at a high temperature or in a vacuum after the fabrication of the hemispheres.

Further, the tapered sleeve 2 is made of steel, and has high hardness as a result of a hardening process applied thereto as necessary, so that the tapered sleeve 2 is finished with high precision in terms of respective dimensions thereof, and in particular, the tapered parts on both sides are finished to high-precision dimensions.

Further, the hemispheres 3-1, 3-2 may be made of steel, RB ceramic or CRB ceramic, and the tapered sleeve 2 may be made of RB ceramic or CRB ceramic.

The RB ceramic or CRB ceramic is preferably impregnated sufficiently with a lubricating oil.

In the case of a sphere made of steel or other ceramic, the sphere is not normally impregnated with lubricating oil.

In any case, with such a bearing structure as described above, load will be borne on contact lines (where P and P' are present), constituting contact points between the respective hemispheres and the respective tapered parts of the tapered sleeve 2.

Figure 5:
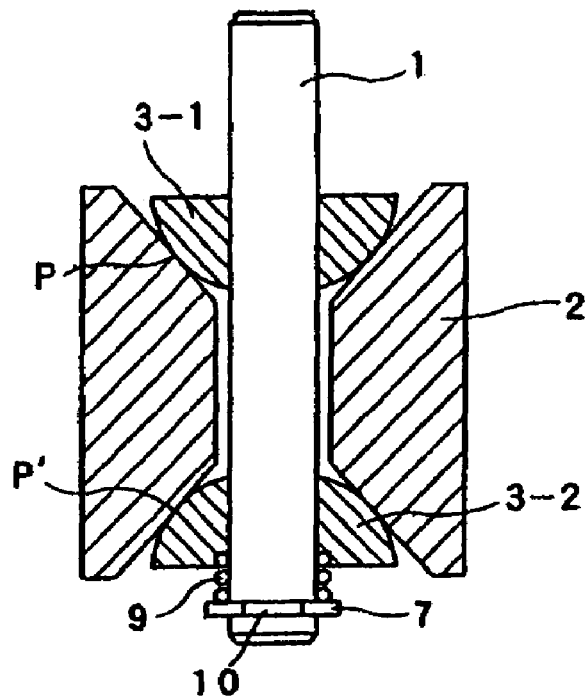
FIG. 5 is a sectional view of a further example of a special type bearing device according to the invention.

The special type bearing device (R-A) shown in FIG. 1 has the following features:

Case A where the hemispheres are made of RB ceramic or CRB ceramic, and the tapered sleeve is made of steel:
  less rotational deflection of the shaft after assembled due to spherical contact
  small friction coefficient and high wear resistance. These features are further enhanced when the hemispheres are impregnated with a lubricating oil.
  variation in the dimensions of the hemispheres themselves, dependent on variation in temperature, becomes negligible due to small expansion coefficient of the hemispheres, and because the shaft 1 and the tapered sleeve 2 are made of an iron based material, variation in the dimensions thereof, dependent on variation in temperature, can be held down to the minimum. In particular, due to this feature, variation in the positions of the contact lines (points P, P' in FIG. 1) can be reduced, thereby enabling the effect of variation (increase/decrease) of backlash occurring due to an increase in temperature to be lessened.
  this being the case of line contact instead of surface contact as in the case of a conventional type bearing, a sliding friction torque is small, fluctuation in torque is small, and heat generation is also small.
  reduction in the weight of the special type bearing device is possible due to a low specific gravity thereof
  the special type bearing device can be utilized as an electrical conductor
  if there is provided a structure wherein preload is continuously applied from either the hemisphere 3-1 or the hemisphere 3-2 by the urging of a spring as shown in FIG. 5, automatic correction against wear can be implemented in case that wear occurs on the contact lines passing the points P, P', respectively, because this will cause contact between respective spheres and tapered surfaces
  there is no need of applying a heat treatment in order to increase the hardness of the shaft 1
  the special type bearing device is provided in the form of a completed unit, so that it can be assembled into equipment with ease.

Case B where the hemispheres are made of steel, and the tapered sleeve is made of RB ceramic or CRB ceramic:
  The special type bearing device in this case has substantially the same features as those for the case A as described above.

Figure 3:
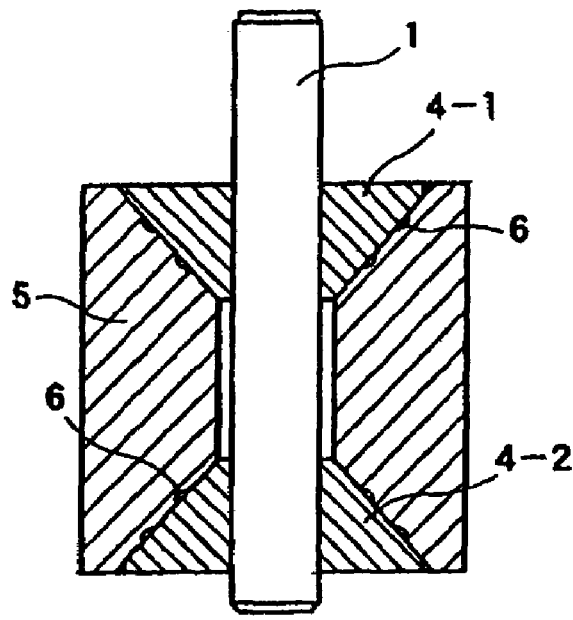
FIG. 3 is a sectional view of another example of a special type bearing device according to the invention.

FIG. 3 shows another example of a special type bearing device according to the invention as (R-B).

This special type bearing device is the same in construction as the previously described example (R-A) except that the hemispheres made of RB ceramic or CRB ceramic are configured into the shape of a cone, thereby rendering the construction thereof suitable for use under a high load and at a low speed.

With the special type bearing device, a cone 4-1, made of RB ceramic or CRB ceramic, is fixedly attached to a shaft (an axis) 1 by bonding in a press fit or by other means, and is inserted into the bore of a conical sleeve 5 as far as the conical surface of the cone 4-1 comes into contact with the conical surface of the conical sleeve 5. Subsequently, a cone 4-2 is fitted into the bore of the conical sleeve 5 from the other end of the shaft 1 as far as the cone 4-2 comes into contact with the conical surface of the conical sleeve 5, on the other side thereof while applying preload thereto, thereby fixedly attaching the cone 4-2 to the shaft 1 by bonding in a press fit or by other means such as a mechanical method.

The conical sleeve 5 is made of steel, and has a high hardness as a result of a hardening process applied thereto as necessary, so that the conical sleeve 5 is finished with high precision in terms of respective dimensions thereof, and in particular, the conical surfaces on both sides are finished to high-precision dimensions.

Further, grooves 6 are provided on the conical surface of the conical sleeve 5 as necessary in order to allow wear powder or other foreign matters such as dust to be removed from friction faces thereof, thereby avoiding friction trouble. The grooves are configured into an annular shape, spiral shape, or radial shape.

With this bearing device, the cones 4-1, 4-2 may be made of steel, RB ceramic or CRB ceramic, and the conical sleeve 5 may be made of RB ceramic or CRB ceramic.

Further, with this bearing device as well, the RB ceramic or CRB ceramic is preferably impregnated sufficiently with a lubricating oil.

In any case, with such a bearing structure as described above, load will be borne by surface contact parts between the conical surfaces of the cones and the conical surface of the conical sleeve, so that this bearing device based on surface contact has enhanced load resistance in contrast with the special type bearing device (R-A) shown in FIG. 1, based on line contact.

The special type bearing device (R-B) has the following features:

Case A where the cones are made of RB ceramic or CRB ceramic, and the conical sleeve is made of steel:
  small friction coefficient and high wear resistance. This feature is further enhanced when the cones are impregnated with a lubricating oil.
  because of small friction coefficient, a friction torque is small, and heat generation is also small.
  suitable for use under a high load because load is borne through surface contact on the conical surface.
  variation in the dimensions of the cones themselves, dependent on variation in temperature, becomes negligible due to small expansion coefficient of the cones, and because the shaft 1 and the conical sleeve 5 are made of an iron based material, variation in the dimensions thereof, dependent on variation in temperature, can be held down to the minimum. In particular, due to this feature, variation in the position of impingement on contact surfaces can be reduced, thereby enabling the effect of variation (increase/decrease) of backlash occurring due to an increase in temperature to be lessened.
  reduction in the weight of the special type bearing device is possible due to a low specific gravity thereof.
  the special type bearing device can be utilized as an electrical conductor.
  if there is provided a structure wherein preload is continuously applied from either the cone 4-1 or the cone 4-2 by the urging of a spring, automatic correction for wear on both the conical surfaces can be implemented.
  there is no need of applying a heat treatment in order to increase the hardness of the shaft 1.

the special type bearing device is provided in the form of a completed unit, so that it can be assembled into equipment with ease.

Case B where the cones are made of steel, and the conical sleeve is made of RB ceramic or CRB ceramic:

The special type bearing device in this case has substantially the same features as those for the case A.

Figure 4:
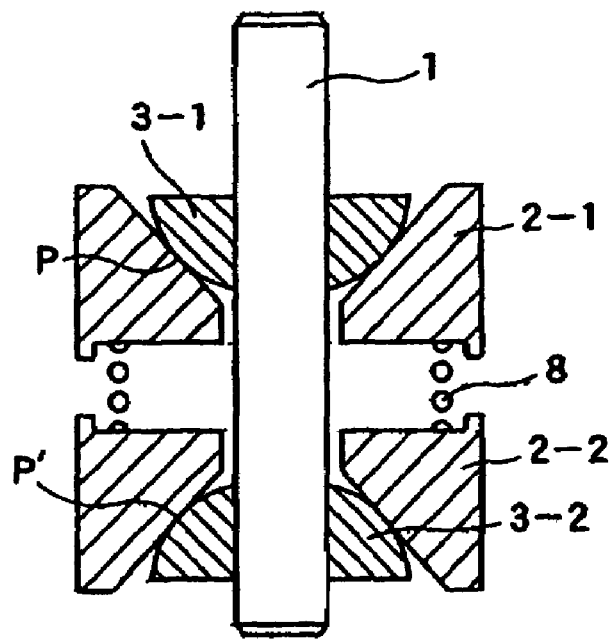
FIG. 4 is a sectional view of still another example of a special type bearing device according to the invention.

FIG. 4 shows still another example of a special type bearing device according to the invention as (R-C).

This special type bearing represents a special type bearing device featuring a constitution wherein the tapered sleeve 2 as for the special type bearing device (R-A) of a hemisphere type, constructed as shown in FIG. 1, is divided into two equal parts, and springs are provided therebetween for preloading.

This special type bearing device is constructed such that springs 8 are assembled in-between a tapered sleeve 2-1 and a tapered sleeve 2-2, formed by dividing a tapered sleeve into two, so as to constantly apply preload to a contact line between a hemisphere 3-1 and the tapered sleeve 2-1 (contact points P are present on the contact line) as well as a contact line between a hemisphere 3-2 and the tapered sleeve 2-2 (contact points P' are present on the contact line), so that automatic correction of backlash due to wear, and so forth, occurring to friction parts in contact with each other, is enabled.

As with the other examples, the special type bearing device (R-C) has such different constitutions as follows: a case A where the hemispheres are made of RB ceramic or CRB ceramic, and the tapered sleeves are made of steel; and a case B where the hemispheres are made of steel, and the tapered sleeves are made of RB ceramic or CRB ceramic.

With the special type bearing device (R-C) as well, the RB ceramic or CRB ceramic is preferably impregnated sufficiently with a lubricating oil.

Further, this method of dividing the tapered sleeve into two equal parts is similarly applicable to the special type bearing device (R-B) of a cone type, constructed as shown in FIG. 3.

FIG. 5 shows a further example of a special type bearing device according to the invention as (R-D).

The special type bearing device (R-D) is the same as the special type bearing device (R-A) of the hemisphere type, constructed as shown in FIG. 1, except that it is constructed such that preload is constantly applied to a hemisphere 3-2 on the bottom side thereof by the urging of a spring 9, the hemisphere 3-2 on the bottom side is out of contact with a shaft 1, and slidable in the axial direction of the shaft 1 while mechanically restrained against rotation in the direction of rotation of the shaft 1, and the spring 9 is installed so as to be interjacent between a flat face of the hemisphere 3-2, in contact with one end thereof, and a snap ring 7 fitted into a groove 10 provided at the rear end of the shaft 1, in contact with the other end thereof, so that preload is constantly applied to a contact line (contact points P' in FIG. 5) by the urging of the spring 9.

A receptacle structure for the other end of the spring 9 is not limited to that of a snap ring type, and other mechanical type may be adopted instead.

With such a construction as described, automatic correction of backlash due to wear, and so forth, occurring to friction parts (contact points P, P' in FIG. 4), can be implemented as with the case of the special type bearing device (R-C), constructed as shown in FIG. 4.

In this case as well, a hemisphere 3-1, and the hemisphere 3-2 may be made of steel, RB ceramic or CRB ceramic, and a tapered sleeve 2 may be made of RB ceramic or CRB ceramic as with the case of the special type bearing device (R-A), constructed as shown in FIG. 1.

With the special type bearing device (R-D) as well, the RB ceramic or CRB ceramic is preferably impregnated sufficiently with a lubricating oil.

FIG. 6 shows a still further example of a special type bearing device according to the invention as (R-E).

The bearing (R-E) represents the special type bearing device of a construction using a special type bearing made of RB ceramic or CRB ceramic, wherein a side ring 11 made of steel or other material is fixedly attached to a shaft 1 in a press fit, or formed integrally with the shaft 1, the shaft 1 is inserted into the bore of a sleeve bearing 14 with a fitting clearance adequate for slidable rotation, and a side ring 12 also made of steel or other material is fitted onto the shaft 1 from the other end thereof while applying preload so as to be fixedly attached to the shaft 1 in a pressurized state by bonding or by other means such as a mechanical method.

Grooves 13 are formed on a friction face of the side rings 11, 12, respectively, in contact with the sleeve bearing 14, as necessary, in order to allow wear powder or other foreign matters such as dust to be removed from the friction faces, thereby avoiding friction trouble. The grooves 13 are configured into an anular shape, spiral shape, radial shape, or so forth.

The RB ceramic or CRB ceramic is preferably impregnated sufficiently with a lubricating oil.

As with the special type bearing device (R-D) constructed as shown in FIG. 5, this special type bearing device may also be constructed such that preload is constantly applied to the side ring 11 by the urging of a spring.

Figure 7:
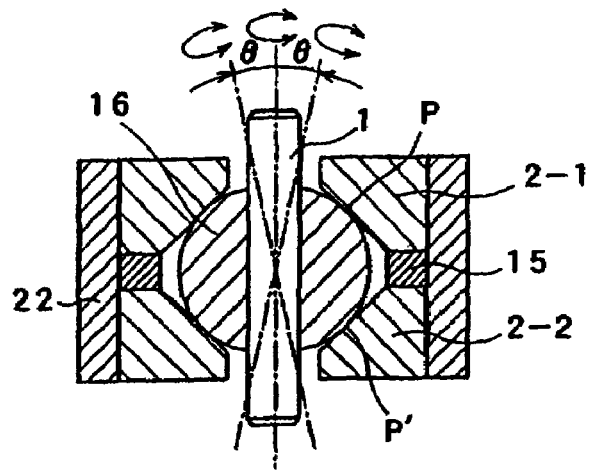
FIG. 7 is a sectional view of an yet further example of a special type bearing device according to the invention.

FIG. 7 shows an yet further example of a special type bearing device according to the invention as (R-F).

The bearing (R-F) represents a spherical special type bearing device. With the spherical special type bearing device (R-F), a sphere 16 made of RB ceramic or CRB ceramic is fitted onto a shaft 1 to be fixedly attached thereto, and is sandwiched between respective tapered parts of a tapered sleeve 2-1, and a tapered sleeve 2-2, both made of steel, and assembled together with dimensions set in such a way as to enable adequate preload to be applied to contact lines (contact points P, P' are present on the respective contact lines) by the agency of spacers 15. Further, the spherical special type bearing device (R-F) in whole is assembled into a housing 22.

The spherical special type bearing device (R-F) may adopt a reverse constitution such that the sphere 16 is made of steel while the tapered sleeve 2-1 and the tapered sleeve 2-2 are made of RB ceramic or CRB ceramic.

With the spherical special type bearing device (R-F) as well, the RB ceramic or CRB ceramic is preferably impregnated sufficiently with a lubricating oil.

The special type bearing device (R-F) is simpler in construction, and lower in production cost in comparison with those bearings currently available in the market.

Figure 8:
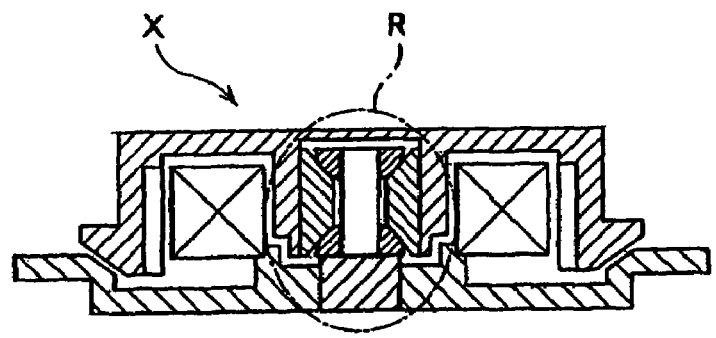
FIG. 8 is a sectional view showing an example of a spindle motor, incorporating the special type bearing device shown in FIG. 1.

FIG. 8 shows an example of a spindle motor incorporating the special type bearing device R of the hemisphere type shown in FIG. 1 in the axial core part thereof as X.

Figure 9:
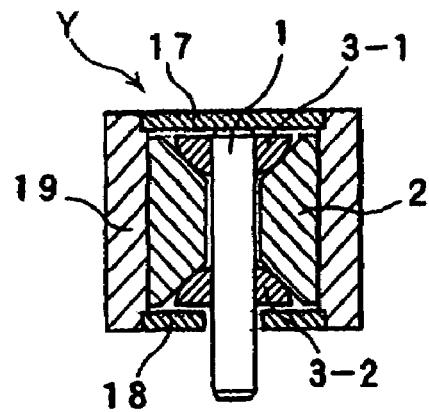
FIG. 9 is a sectional view showing an example of a pivot assembly (hereinafter referred to as ass'y) for a hard disc drive (hereinafter referred to as HDD), incorporating the special type bearing device shown in FIG. 1.

FIG. 9 shows an example of a pivot ass'y bearing for an HDD, incorporating the special type bearing device R of the hemisphere type shown in FIG. 1 as Y.

The pivot ass'y bearing Y is fabricated by assembling the special type bearing device R into a sleeve 19 of a pivot ass'y bearing for a swing arm of an HDD, and mounting a seal cover 18 on the sleeve 19 for sealing to prevent leakage of oil.

Assembling of the sleeve 19 into an assembling part of equipment for various applications will suffice to set up this pivot ass'y bearing.

The pivot ass'y. bearing Y may be used in the same way as for common bearings of various types (sleeve bearing, ball bearing, and so forth).

Figure 10:
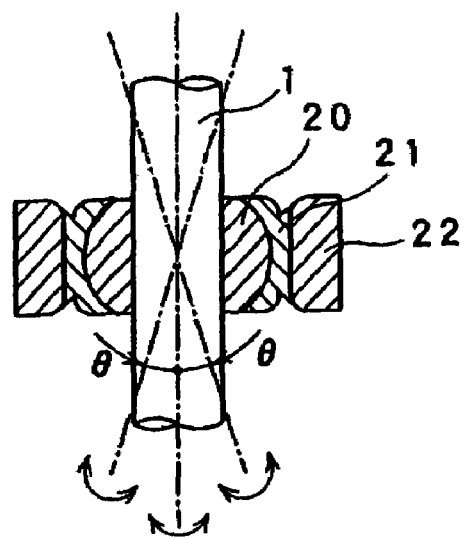
FIG. 10 is a sectional view of another example of a special type bearing device according to the invention.

FIG. 10 shows another example of a special type bearing device according to the invention as (R-G).

With the special type bearing device (R-G), a shaft 1 is inserted in a press fit into a hole at the center of a sphere made of steel to be fixedly attached thereto, a sphere of a spherical inner race 20 is slidably fitted to an outer race 21 to be assembled with each other, and the outer periphery of the outer race 21 is fitted into a housing 22 to be fixed thereto by swaging.

Thus, the special type bearing device (R-G) is a bearing constructed so as to enable the shaft 1 to oscillate at an angle of θ while in rotation.

Figure 11:
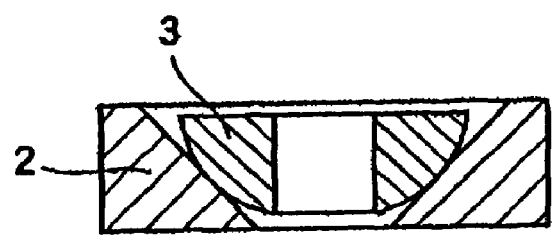
FIG. 11 is a sectional view showing an example of a special type bearing device according to the invention, comprising a bearing of a single structure.

FIG. 11 shows still another example of a special type bearing device according to the invention as (R-H).

The special type bearing device (R-H) is a bearing employing only one of the hemispheres in the special type bearing device (R-A) constructed as shown in FIG. 1, comprising a tapered sleeve 2, a hemisphere 3, and a shaft (not shown) fixedly attached to the hemisphere 3.

The tapered sleeve 2 is in line contact with the hemisphere 3, and by applying preload to a contact line therebetween, automatic correction of backlash due to wear and so forth, occurring to friction parts (points P in FIG. 4) can be implemented as with the case of the special type bearing device (R-C) constructed as shown in FIG. 4.

In this case as well, the hemisphere 3 may be made of steel, RB ceramic or CRB ceramic, and the tapered sleeve 2 may be made of RB ceramic or CRB ceramic as with the case of the special type bearing device (R-A) constructed as shown in FIG. 1.

With the special type bearing device (R-H) as well, the RB ceramic or CRB ceramic is preferably impregnated sufficiently with a lubricating oil.

Further, it is possible to employ two units of the special type bearing devices (R-H), disposed so as to face each other. It is also possible to employ a plurality of units of these, overlaid one after another, as necessary. Furthermore, the special type bearing device (R-H) may be employed in combination with a special type bearing device (R-I) as shown in FIG. 12.

Figure 12:
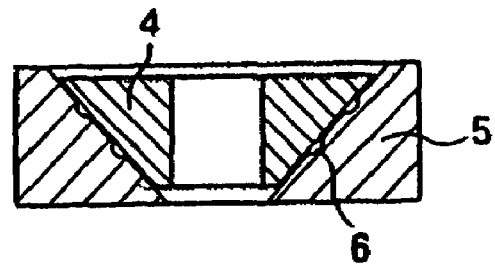
FIG. 12 is a sectional view showing another example of a special type bearing device according to the invention, comprising a bearing of a single structure.

FIG. 12 shows a further example of the special type bearing device according to the invention as (R-I).

This special type bearing device represents a bearing of a single structure, comprising only one of the same rotating bodies made of RB ceramic or CRB ceramic as employed in the special type bearing device (R-B) so as to be suitable for use under a high load and at a low speed.

With the special type bearing device (R-I), a cone 4. made of RB ceramic or CRB ceramic, is fixedly attached to a shaft (an axis) 1 (not shown) by bonding in a press fit or by other means, and is inserted into the bore of a conical sleeve 5 as far as the conical surface of the cone 4 comes into contact with the conical surface of the conical sleeve 5.

The conical sleeve 5 is made of steel, and has a high hardness as a result of a hardening process applied thereto as necessary, so that the conical sleeve 5 is finished with a high precision in terms of respective dimensions thereof, and in particular, the conical surfaces thereof on both sides as seen in section are finished to high-precision dimensions.

Further, grooves 6 are provided on the conical surface of the conical sleeve 5 as necessary in order to allow wear powder or other foreign matters such as dust to be removed from friction faces, thereby avoiding friction trouble. The grooves are configured into an annular shape, spiral shape, or radial shape.

Further, with this bearing, the cone 4 may be made of steel, RB ceramic or CRB ceramic, and the conical sleeve 5 may be made of RB ceramic or CRB ceramic.

With this bearing as well, the RB ceramic or CRB ceramic is preferably impregnated sufficiently with a lubricating oil.

In any case, with such a bearing structure as described above, load will be borne on surface contact parts between the conical surface of the cone and the conical surface of the conical sleeve, so that the special type bearing device R-I, based on surface contact, has its load resistance improved in contrast with the special type bearing device (R-H) of the hemisphere type, shown in FIG. 11, which is based on line contact.

The special type bearing device (R-I) has the same features as those of the special type bearing device (R-B).

Further, it is possible to employ two units of the special type bearing devices (R-I), disposed so as to face each other. It is also possible to employ a plurality of units of the special type bearing devices (R-I), overlaid one after another, or disposed so as to face each other, as required. Furthermore, the special type bearing device (R-I) may be employed in combination with the special type bearing device (R-H) as shown in FIG. 11.

Now, the special type bearing device according to the invention exhibits particular effects unachievable by conventional bearing devices in that it is insusceptible to damage, is light in weight, has a long service life and excellent wear resistance, is insusceptible to the effect of change in temperature, is easy to fabricate, and has little offensiveness towards mating members, and further, the same can exhibit a pronounced advantageous effect in that, due to its porosity, it is capable of sufficiently retaining a lubricant such as oil and grease, and thereafter, retaining the lubricant for a long period of time without the need of supplying oil during operation, thereby rendering it maintenance-free. In particular, the special type bearing device according to the invention, using CRB ceramic, has an advantage of a small contraction ratio of the dimensions of a finished product to those of a formed workpiece, thereby enabling a high-precision product to be fabricated with ease.

What is claimed is:

1. A spherical bearing device comprising an axial shaft, at least one rotating body in the shape of a sphere having a convex surface, fixedly attached to the axial shaft, and a supporting body having a concave spherical surface, the convex surface of the rotating body being slidably fitted to the concave spherical surface of the supporting body, at least one of the axial shaft, the rotating body, and the supporting body being made of an RB or CRB ceramic, wherein the RB ceramic is obtained by mixing a degreased bran derived from rice bran with a thermosetting resin to form a first mixture, kneading the first mixture, pressure forming the kneaded first mixture, drying the formed and kneaded first mixture and firing the dried, formed and kneaded first mixture in an inert gas atmosphere at a temperature in a range of 700 to 1000° C. to form the RB ceramic and the CRB ceramic is obtained by mixing a degreased bran derived from rice bran with a thermosetting resin to form a second mixture, kneading the second mixture, subjecting the kneaded second mixture to a primary firing in an inert gas at a temperature in a range of 700 to 1000° C., pulverizing the kneaded and fired second mixture into carbonized powders, mixing the carbonized powders with a thermosetting resin to form a third mixture, kneading the third mixture, pressure-forming the kneaded third mixture at a pressure in a range of 20 to 30 MPa to provide a formed and kneaded third mixture and subjecting the formed and kneaded third mixture to a heat treatment at a temperature in a range of 100 to 1100° C. in an inert gas atmosphere to form the CRB ceramic.

2. A bearing device as set forth in claim 1, wherein any one of the axial shaft, the at least one rotating body, and the supporting body is made of an RB ceramic or CRB ceramic, and the RB ceramic or the CRB ceramic is impregnated with a lubricating oil.

* * * * *